Patented Sept. 14, 1926.

1,599,930

UNITED STATES PATENT OFFICE.

JOKICHI TAKAMINE, JOKICHI TAKAMINE, JR., AND NOBUCHIKA FUJITA, OF PASSAIC, NEW JERSEY.

MANUFACTURE OF BREAD.

No Drawing. Application filed March 25, 1922. Serial No. 546,785.

This invention relates to the manufacture of bread.

The object of the invention is to secure economies in the art and industry of bread manufacture.

We have discovered that when enzymes possessing diastatic and proteolytic properties are mixed with glucose syrup in proper proportion not only are the enzymes stabilized and preserved against fermentation and other deterioration, but also a product is obtained which greatly increases the fermenting activities of the yeast, thereby permitting a reduction in the quantity of yeast necessary in bread making as well as of the quantity of sugar required, and also effecting a saving of the amount of flour and of the time required in the bread manufacturing operations.

The diastatic and proteolytic enzymes may be obtained in various ways. We have found that it is suitable to obtain such enzymes by the propagation of a suitable fungus upon a proper medium under proper conditions of temperature, moisture and ventilation for a period of time permitting the fungus to develop and grow abundantly to a stage short of maturity. In practice the seed spores of a fungus belonging to the genus Aspergillus is suitable for our purposes, although the seed spores of fungi or other genera such as Mucor, Pennecillium, etc., may be used, and we have found that the seed spores of the fungus Aspergillus oryzae are efficient for our purposes. The material upon which the fungus is developed may be of any suitable character. In practice we prefer to use a medium composed of or containing cereals, and particularly we have found wheat brans, middlings, and the like, efficient. The selected medium is inoculated with the seed spores of the desired fungus and the mass is maintained for a period of thirty to fifty hours in a moist atmosphere at a temperature not to exceed 70° F. to 100° F., with suitable ventilation. The mass is then extracted with a suitable solvent, such as water. This extract is then, in accordance with our invention, added to glucose syrup in liquid form in the proportion of about 15% to 20% by weight of the extract. We have discovered that hydrolysis is liable to take place where the extract is in the form of a thin liquid, but that this may be overcome by adding thereto a suitable substance capable of exerting a dehydrating action thereon, and we have found that cane sugar or glycerine will answer the purpose. If, however, the extract is concentrated hydrolyzation is prevented and hence solidification is avoided. The concentrated extract is added to the liquid glucose in about the proportions of 5% by weight. Hence the product obtained, as above described, is of and remains in liquid condition. We have also discovered that the glucose syrup acts not only as a body or carrier for the diastatic and proteolytic enzymes but also as a stabilizing or antiseptic agent to preserve the diastatic and proteolytic enzymes against fermentation or deterioration. We have also discovered that it is not practical to employ the enzymes in the dry state in the mixture thereof with liquid glucose, but that an aqueous solution of enzymes, whether concentrated or not, and in the relative proportions above specified when added to glucose syrup solidification or crystallization of the glucose syrup will not take place for the reason that no hydrolyzation of the dextrins present in the glucose syrup is accomplished.

A product obtained as above described is employed in the manufacture of bread in approximately the relative proportions in which malt extracts are at present employed and as partially a substitute for such malt extracts.

By reason of the property of the product to nourish and increase the fermenting activity of the yeast employed in the dough batch a very substantial saving is effected not only in the amount of yeast required but also in the amount of sugar as well as flour, and in addition a saving of time of fermentation is effected. At the same time a loaf of better quality of bread with a better bloom and texture and a distinctive flavor is also secured. In other words, in comparison with loaves of bread of equal volume produced according to present well known bakery practice and using the same ingredients of the dough batch but with a less quantity of flour, sugar and yeast, and a shorter period of fermentation, a better bread loaf is obtained by the use and employment of our invention. The saving effected in the case of sugar as we have actually demonstrated amounts to about twenty per cent, while the saving of yeast is about ten per cent, and that of flour of about one per cent, and the time of fermentation materially reduced.

Having now set forth the object and nature of our invention, and the manner of carrying same into practical operation, what we claim as new and useful and desire to secure by Letters Patent is,—

1. The process of obtaining a stable liquid enzyme compound which comprises combining diastatic and proteolytic enzymes with glucose syrup.

2. The process of obtaining a stable liquid enzyme compound which comprises combining diastatic and proteolytic enzymes in liquid form with glucose syrup.

3. The process which consists in extracting diastatic and proteolytic enzymes from a culture medium on which a vegetable fungus growth has been propagated, and stabilizing the extract with glucose syrup.

4. The process of stabilizing enzymes of vegetable fungus origin, which consists in combining said enzymes with glucose syrup.

5. The process of obtaining a stable enzyme compound, which consists in combining enzymes derived from vegetable fungus growth, in liquid form, with glucose.

6. An article of manufacture comprising a stabilized diastatic and proteolytic extract obtained from a culture medium on which a vegetable fungus has been propagated, said extract containing glucose syrup.

7. An article of manufacture comprising a stable compound containing diastatic and proteolytic enzymes and glucose syrup.

8. As an article of manufacture, a stable liquid compound containing diastatic and proteolytic enzymes and glucose in liquid form.

In testimony whereof we have hereunto set our hands on this 21st day of March A. D., 1922.

JOKICHI TAKAMINE, Jr.
JOKICHI TAKAMINE.
NOBUCHIKA FUJITA